No. 757,109.                                               Patented April 12, 1904.

UNITED STATES PATENT OFFICE.

GILLIS GULLBRANSSON, OF HÖCHST-ON-THE-MAIN, GERMANY, ASSIGNOR TO FARBWERKE, VORM. MEISTER, LUCIUS & BRÜNING, OF HÖCHST-ON-THE-MAIN, GERMANY, A CORPORATION OF GERMANY.

BLUE-RED LAKE AND PROCESS OF MAKING SAME.

SPECIFICATION forming part of Letters Patent No. 757,109, dated April 12, 1904.

Application filed March 3, 1903. Serial No. 145,992. (Specimens.)

*To all whom it may concern:*

Be it known that I, GILLIS GULLBRANSSON, chemist, a citizen of the Kingdom of Sweden, residing at Höchst-on-the-Main, Germany, have invented certain new and useful Improvements in the Manufacture of New Color-Lakes, of which the following is a specification.

This invention relates to the manufacture of color-lakes (pigment colors) by precipitating, by methods well known in the preparation of this class of colors, the mono-azo dyestuff obtained by the action of diazotized orthoamidobenzoic acid and the sodium salt of beta-naphthol-disulfonic acid R. The lakes produced are remarkably fast to light, in which regard they surpass the lakes derived from the phthalic-acid dyestuffs, (eosines,) while approximating these in beauty and brilliancy of tint. The manufacture is effected, as usual, by suspending or mixing the substratum in water and adding thereto the diazotized orthoamidobenzoic acid and the sodium salt of beta-naphthol-disulfonic acid R and then precipitating by addition of the precipitant dissolved or suspended in water or the substratum may be added after precipitation of the dyestuff with the precipitant. It is also practicable to produce the substratum at the same time that the color-lake is being precipitated. Again, the process may be that described in English Patent No. 5,167/01, in which lakes insoluble in water are obtained by selection of a suitable hydroxid.

*Manufacture of the Color-Lake on the Finished Substratum.*

Example I: Ten kilos of barium sulfate are made into a magma with two hundred liters of water, a solution of two kilos of the dyestuff from orthoamidobenzoic acid and the sodium salt of beta-naphthol-disulfonic acid R in one hundred liters of water being added. After warming to 70° centigrade a solution of two kilos of barium chlorid in forty liters of water is stirred in until precipitation is complete. The lake is separated by decantation or otherwise and finished in the usual manner.

*Precipitation of the Color-Lake with Formation of the Substratum.*

Example II: To a solution of ten kilos of Glauber salt in two hundred liters of water are added 2.5 kilos of the dyestuff obtained from orthoamidobenzoic acid and the sodium salt of beta-naphthol-disulfonic acid R in one hundred and twenty-five liters of water. After warming to 70° centigrade a solution of ten kilos of barium chlorid in two hundred liters of water is stirred in as before.

Example III: Five kilos of aluminium sulfate are dissolved in one hundred liters of water, to which is added, with stirring, a solution of 2.5 kilos of soda-ash in twenty-five liters of water, two kilos of the dyestuff from orthoamidobenzoic acid and the sodium salt of beta-naphthol-disulfonic acid R being run in. The lake is then precipitated at 70° centigrade by stirring in a solution of 6.25 kilos of barium chlorid in one hundred liters of water.

*Precipitation by the Process of English Patent No. 5,167/01.*

Example IV: One hundred kilos of a magma of lead hydroxid of twenty per cent. are stirred into one hundred liters of water, six kilos of the dyestuff from orthoamidobenzoic acid and the sodium salt of the beta-naphthol-disulfonic acid R in three hundred liters of water being added. After warming to 90° centigrade a magma of twenty kilos of aluminium hydroxid of seventy-five per cent. $Al_2O_3$ dissolved in one hundred liters of water is stirred in until precipitation is complete.

Having now described my invention, what I claim is—

1. The herein-described process of making blue-red color-lakes (pigment colors) fast to light, which consists in precipitating the azo dyestuff from diazotized orthoamidobenzoic acid and beta-naphthol-disulfonic acid R with a precipitant, substantially as set forth.

2. As new products, blue-red color-lakes (pigment colors) fast to light, obtained from the azo dyestuff from diazotized orthoamidobenzoic acid and beta-naphthol-disulfonic acid R, being blue-red powders or pastes, insoluble in cold and hot water, also insoluble in oils and varnishes, yielding orthoamidobenzoicacid and alpha-amido-beta-naphthol-disulfonic acid when treated with stannous chlorid.

In testimony that I claim the foregoing as my invention I have signed my name in presence of two subscribing witnesses.

GILLIS GULLBRANSSON.

Witnesses:
ALFRED BRISBOIS,
BERNHARD LYDECKER.